(12) United States Patent
Aoki

(10) Patent No.: US 7,133,603 B2
(45) Date of Patent: Nov. 7, 2006

(54) MOTOR DRIVING APPARATUS, DIGITAL CAMERA, AND MOTOR CONTROLLING METHOD

(75) Inventor: Kazumasa Aoki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 11/065,575

(22) Filed: Feb. 25, 2005

(65) Prior Publication Data

US 2005/0191043 A1    Sep. 1, 2005

(30) Foreign Application Priority Data

Feb. 27, 2004    (JP) .............................. 2004-053694

(51) Int. Cl.
*H02P 7/288* (2006.01)

(52) U.S. Cl. ...................... 388/838; 388/803; 388/806; 388/807; 388/816

(58) Field of Classification Search ................ 388/838, 388/830, 803, 806, 807, 816; 318/469, 434
See application file for complete search history.

(56) References Cited

U.S. PATENT DOCUMENTS 3,697,158 A * 10/1972 Mateja ........................ 352/17

| | | | | |
|---|---|---|---|---|
| 3,898,679 A * | 8/1975 | Ogiso et al. | ................. | 396/263 |
| 4,246,521 A | 1/1981 | Soeda et al. | ................. | 318/331 |
| 4,458,992 A * | 7/1984 | Preston | ........................ | 352/141 |
| 4,615,600 A * | 10/1986 | Nakajima et al. | ........... | 396/259 |
| 4,669,840 A * | 6/1987 | Samuelson | ................... | 352/170 |
| 5,051,672 A * | 9/1991 | Yaguchi | ...................... | 318/469 |
| 5,223,867 A * | 6/1993 | Nguyen-Nhu | ............... | 352/180 |
| 5,907,725 A * | 5/1999 | Nomura et al. | ................ | 396/87 |

FOREIGN PATENT DOCUMENTS

| | | |
|---|---|---|
| DE | 31 23 350 | 12/1982 |
| JP | 63-39492 | 2/1988 |
| JP | 63-114578 | 5/1988 |
| JP | 63-114581 | 5/1988 |
| JP | 10-225160 | 8/1998 |
| JP | 2002-78385 | 3/2002 |
| JP | 2003-289692 | 7/2003 |

* cited by examiner

*Primary Examiner*—Rita Leykin
(74) *Attorney, Agent, or Firm*—Oblon, Spivak, McClelland, Maier & Neustadt, P.C.

(57) ABSTRACT

A motor driving apparatus includes a power circuit that controls an output voltage via a feedback resistance. The power circuit varies the output voltage by changing a value of the feedback resistance at a time of at least one of activation and termination of a motor, thereby enabling to activate the motor at any one of a high speed and a low speed.

30 Claims, 5 Drawing Sheets

MOTOR DRIVING APPARATUS, DIGITAL CAMERA, AND MOTOR CONTROLLING METHOD

CROSS-REFERENCE TO RELATED APPLICATIONS

The present document incorporates by reference the entire contents of Japanese priority document, 2004-053694 filed in Japan on Feb. 27, 2004.

BACKGROUND OF THE INVENTION

1) Field of the Invention

The present invention relates to energization of a motor, and more specifically, to a motor driving apparatus that controls a power source of a lens barrel motor of a digital camera, a digital camera, and a motor controlling method.

2) Description of the Related Art

Conventionally, a lens barrel in cameras, such as a digital camera, is collapsibly mounted on the cameras to put emphasis on portability. Furthermore, there is a method for high-speed activation. In the method, a high voltage is applied at a time of activation of a motor. Generally, by changing voltage of a series regulator connected to a power source, supply voltage is directly used when a motor is driven at a high speed, and the voltage is lowered during the motor is driven at an ordinary speed to reduce an electric current for the motor.

As a conventional technology, there is a "motor driving apparatus" that prevents severe shock and pulling-out of synchronism, and uncomfortable vibration noise that occur during acceleration control used when the motor is to be started. Such a technology is disclosed in, for example, Japanese Patent Application Laid-Open Application No. 2002-78385. Moreover, there is a "motor drive controller" that converges vibration control after a motor startup within a short time, and performs phase control and vibration control more accurately after the convergence. Such a technology is disclosed in, for example, Japanese Patent Application Laid-Open Application No. 2003-189692.

However, in the conventional technology, power cannot sufficiently be reduced because the supply voltage is partially consumed by a series regulator.

In the technology disclosed in Japanese Patent Application Laid-Open Application No. 2002-78385, as to a method in which the action of the power source itself is changed at a time of activation, although an input filter circuit is changeable, change in voltage due to change of feedback resistance is not taken into consideration. In addition, a method in which vibration is suppressed by control with sine waves is proposed in the technology disclosed in Japanese Patent Application Laid-Open Application No. 2003-189692, however, change in voltage due to change of feedback resistance is not taken into consideration.

SUMMARY OF THE INVENTION

It is an object of the present invention to solve at least the above problems in the conventional technology.

A motor driving apparatus according to one aspect of the present invention includes a power circuit that controls, via a feedback variable resistance, an output voltage that is applied to a motor. The power circuit varies resistance of the feedback variable resistance at a time of start of activation of the motor thereby causing the motor to activate at any one of a high speed and a low speed.

A motor driving apparatus according to another aspect of the present invention includes a power circuit that controls, via a feedback variable resistance, an output voltage that is applied to a motor. The power circuit varies resistance of the feedback variable resistance at a time of termination of activation of the motor thereby causing the motor to activate at any one of a high speed and a low speed.

A motor driving apparatus according to still another aspect of the present invention includes a power circuit that controls, via a feedback variable resistance, an output voltage that is applied to a motor. The power circuit varies resistance of the feedback variable resistance at times of start and termination of activation of the motor thereby causing the motor to activate at any one of a high speed and a low speed.

A digital camera according to still another aspect of the present invention includes the motor driving apparatus according to the above aspects of the present invention.

A motor controlling method according to still another aspect of the present invention includes controlling, via a feedback variable resistance, an output voltage that is applied to a motor. The controlling includes varying resistance of the feedback variable resistance at a time of at least one of start of activation of the motor thereby causing the motor to activate at any one of a high speed and a low speed.

The other objects, features, and advantages of the present invention are specifically set forth in or will become apparent from the following detailed description of the invention when read in conjunction with the accompanying drawings.

DETAILED DESCRIPTION

Exemplary embodiments of a motor driving apparatus, a digital camera, and a motor controlling method according to the present invention are explained below in detail with reference to the accompanying drawings.

Figure 4:
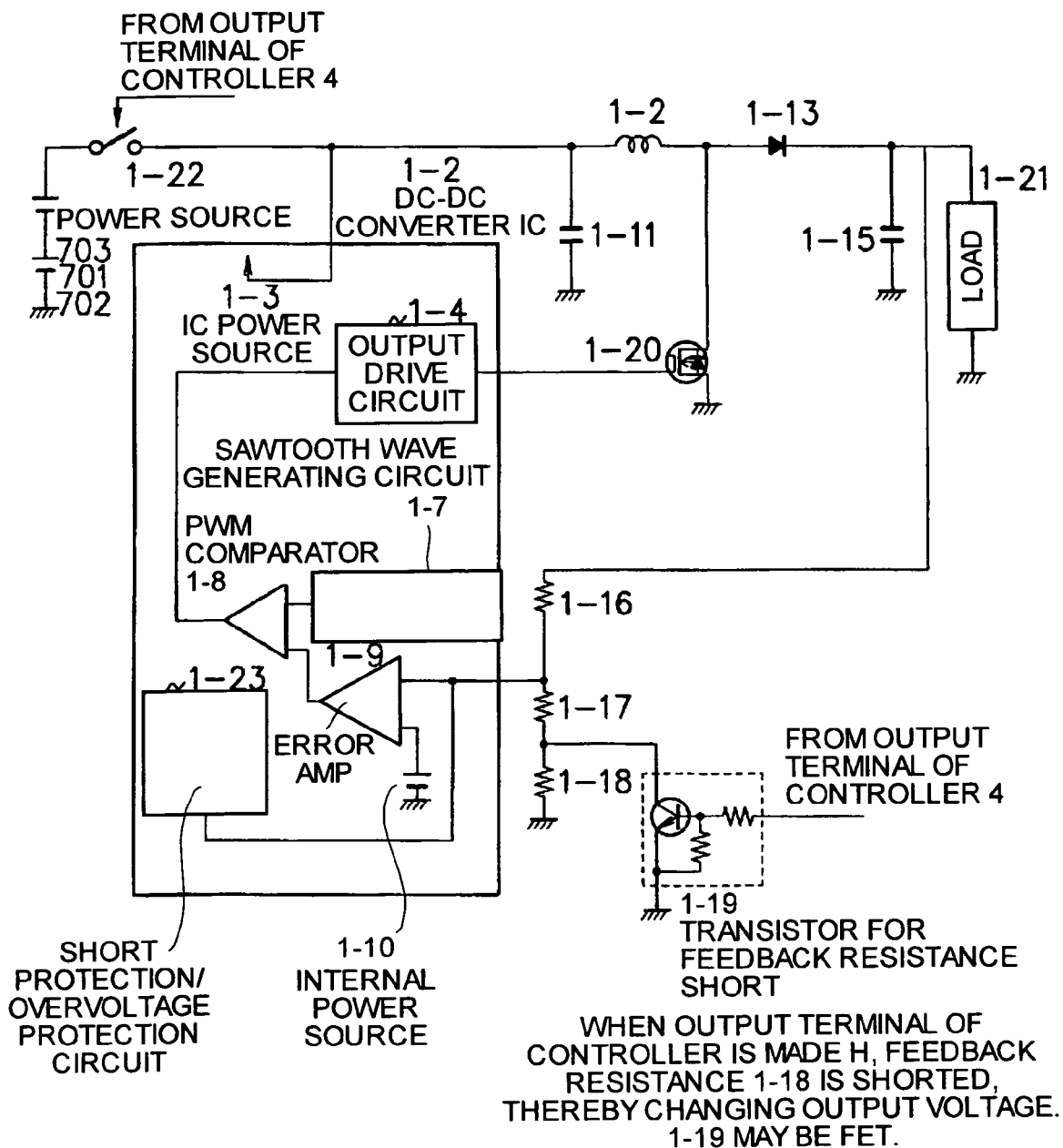
FIG. 4 is a block diagram of a battery terminal voltage measuring unit according to a first embodiment of the present invention.

FIG. 4 is a block diagram of a battery terminal voltage measuring unit according to a first embodiment of the present invention. As shown in FIG. 4, the battery terminal voltage measuring unit includes a power source unit 703, 701, and 702, a power switch 1-22, an input smoothing capacitor 1-11, a voltage step up coil 1-12, a rectifier diode 1-13, an output smoothing capacitor 1-15, a load 1-21 (corresponding to 204, 207, 205, 209, 206, 208, 210 and 211 shown in FIG. 1), a feedback resistance 1 1-16, a feedback resistance 2 1-17, a feedback resistance 3 1-18, a feedback resistance short transistor 1-19, and a direct circuit (DC)-DC converter integrated circuit (IC) 1-2.

The DC-DC converter IC 1-2 includes an IC power source 1-3, an output drive circuit 1 1-4, a pulse width modulation (PWM) comparator 1-8, a sawtooth wave generating circuit 1-7, an error amplifier (AMP) 1-9, an internal power source 1-10, and a short/overvoltage protection circuit 1-23.

When a system controller 4 turns on the power switch 1-22, power is supplied to the power source of the DC-DC converter IC 1-2, thereby activating the IC power source 1-3. Since the output is still 0 volt (V), the DC-DC converter IC starts operating. The voltage divided by resistances of the feedback resistance 1 1-16, the feedback resistance 2 1-17, and the feedback resistance 3 1-18 is input to the error AMP 1-9, and the output is compared with a voltage of the internal power source 1-10, and when the voltage is low, a control signal for the operation is input to the PWM comparator 1-8.

This signal and sawtooth wave levels are compared with each other by the PWM comparator 1-8 and pulse outputs are output. To drive a metal oxide semiconductor (MOS) 1-20, the pulse outputs are output through the output drive circuit 1-4. The short/overvoltage protection circuit 1-23 turns off the DC-DC converter IC when an output voltage exceeds a certain range.

An electric charge stored in the voltage step up coil 1-12 by switching operation of the MOS 1-20 is rectified by the rectifier diode 1-13 and supplied to the load 1-21 smoothened by the output smoothing capacitor 1-15. When the voltage is compared with that of the internal power source 1-10 and exceeds it, the MOS 1-20 turns off by a reverse operation of the above operation.

Figure 5:
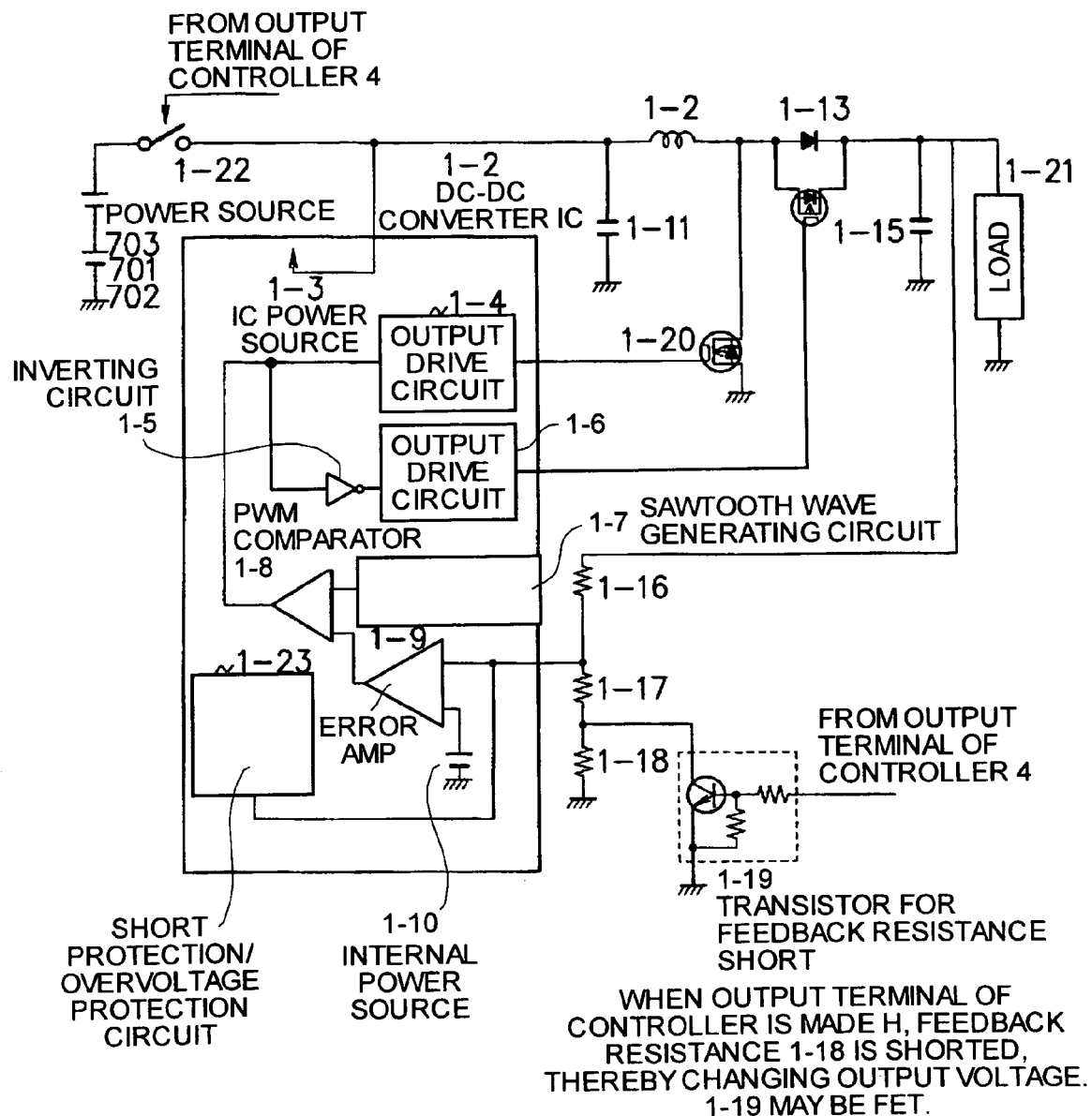
FIG. 5 is a block diagram of a battery terminal voltage measuring unit according to a second embodiment of the present invention.

FIG. 5 is a block diagram of a battery terminal voltage measuring unit according to a second embodiment of the present invention in which synchronized rectification is added. The battery terminal voltage measuring unit according to the second embodiment includes the power source unit 703, 701, and 702, the power switch 1-22, the input smoothing capacitor 1-11, the voltage step up coil 1-12, the rectifier diode 1-13, a synchronized rectification MOS 1-14, the output smoothing capacitor 1-15, the load 1-21 (corresponding to 204, 207, 205, 209, 206, 208, 210, and 211 shown in FIG. 1), the feedback resistance 1 1-16, the feedback resistance 2 1-17, the feedback resistance 3 1-18, the feedback resistance short transistor 1-19, and the DC-DC converter IC 1-2.

The DC-DC converter IC 1-2 includes the IC power source 1-3, the output drive circuit 1 1-4, an inverting circuit 1-5, an output drive circuit 2 1-6, the PWM comparator 1-8, the sawtooth wave generating circuit 1-7, the error AMP 1-9, the internal power source 1-10, and the short/overvoltage protection circuit 1-23.

When the system controller 4 turns on the power switch 1-22, power is supplied to the power source of the DC-DC converter IC 1-2, thereby activating the IC power source 1-3. Since the output is still 0 V, the DC-DC converter IC starts operating. The voltage divided by resistances of the feedback resistance 1 1-16, the feedback resistance 2 1-17, and the feedback resistance 3 1-18 is input to the error AMP 1-9, and the output is compared with a voltage of the internal power source 1-10, and when the voltage is low, a control signal for the operation is input to the PWM comparator 1-8.

This signal and sawtooth wave levels are compared with each other by the PWM comparator 1-8 and pulse outputs are output. To drive the metal oxide semiconductors (MOSs) 1-20 and 1-14, the pulse outputs are output through the output drive circuit 1-4, the inverting circuit 1-5, and the output drive circuit 1-6.

An electric charge stored in the voltage step up coil 1-12 by switching operation of the MOS 1-20 is rectified by the rectifier diode 1-13 and supplied to the load 1-21 smoothened by the output smoothing capacitor 1-15. The MOS 1-14 turns on while the diode carries out the rectifying action and is a switch for synchronized rectification that supplements Vf of the diode. Both metal oxide semiconductors (MOSs) 1-14 and 1-20 may be substituted with transistors. Further, the transistor may be substituted with the MOS.

Figure 1:
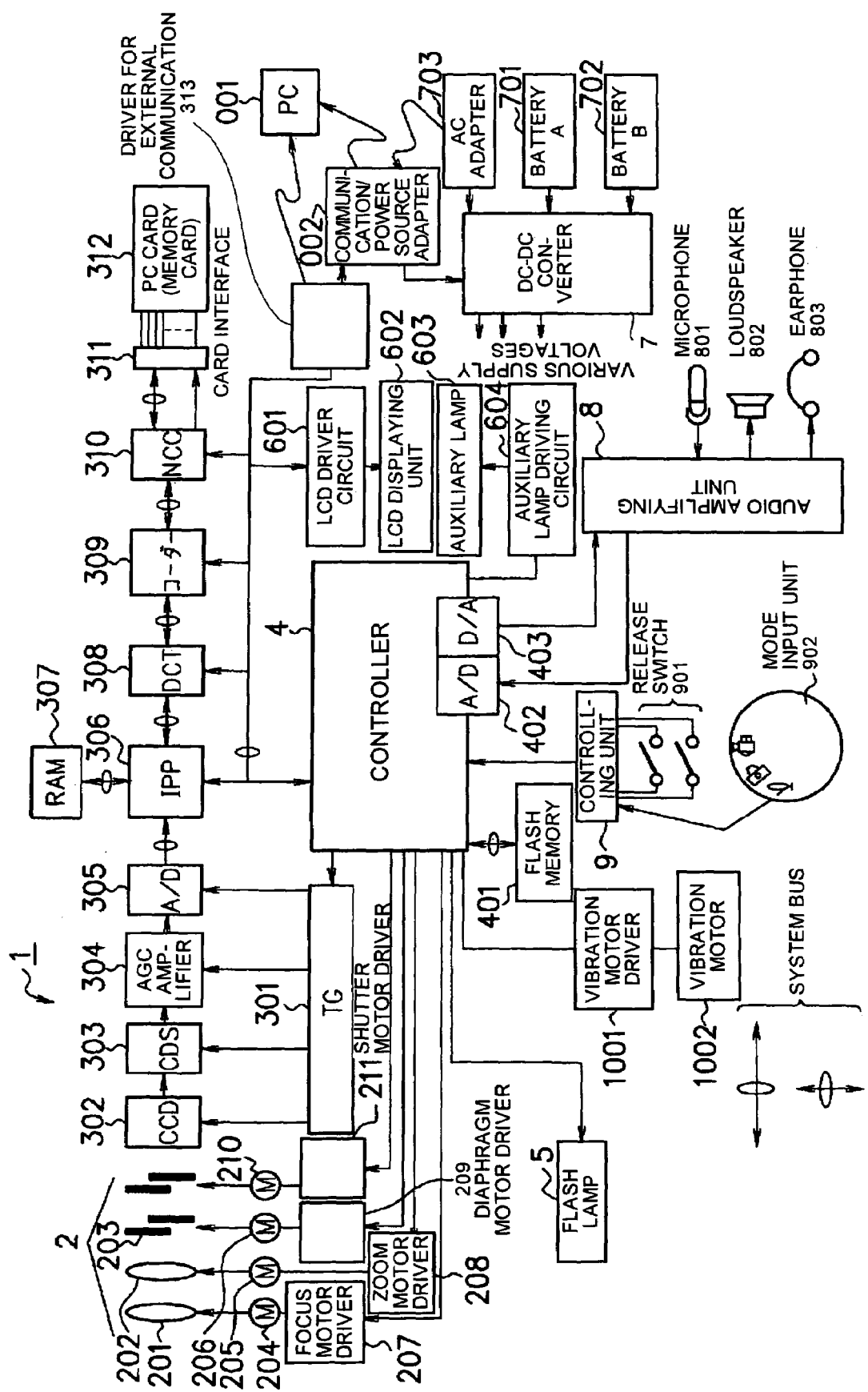
FIG. 1 is a block diagram of a digital camera according to an embodiment of the present invention.

FIG. 1 is a block diagram of a digital camera according to an embodiment of the present invention. The digital camera includes a lens system 2, a focus lens system 201, a zoom lens system 202, a mechanism 203 including diaphragm and the like, a focus motor 204, a zoom motor 205, a diaphragm motor 206, a focus motor driving apparatus 207, a zoom motor driving apparatus 208, a diaphragm motor driving apparatus 209 (a shutter motor 210 and a shutter motor driving apparatus 211 are separately illustrated in this example), a timing generator (TG) 301, a charge coupled device (CCD) 302, a correlation double sampling (CDS) circuit 303, an automatic gain control amplifier (AGC amplifier) 304, an analog-to-digital (A/D) converter 305, an image pre-processor (IPP) 306, a discrete cosine transform (DCT) 308, a Huffman encoder/decoder 309, a memory card controller (MCC) 310, a read only memory (RAM) 307 (inner memory), a card interface 311, a personal computer (PC) card 312 (including memory card etc.), a controller (central processing unit (CPU)) 4, a flash memory (electrically erasable programmable read only memory (EEPROM)) 401, an A/D converter for controller 402, a digital-to analog (D/A) converter for controller 403, system bus lines 404, a liquid crystal display (LCD) displaying unit 602, an auxiliary lamp 603, an auxiliary lamp driving circuit 604, an LCD driver circuit 601, a flash lamp 5, a DC-DC converter 7, a battery A 701, a battery B 702, an alternating current (AC) adapter 703, a controlling unit 9, release switches 901, a mode input unit 902, an audio amplifying unit 8, a microphone 801, a loudspeaker 802, an earphone 803, a vibration motor driving apparatus 1001, and a vibration motor 1002.

The lens unit includes the mechanism 203 including the lens system 2, a diaphragm, a filter, and the like. A mechanical shutter of the mechanism 203 exposes two fields. Although, in FIG. 1, a shutter mechanism is separately illustrated as an exposing unit, the mechanism 203 may also serve as the shutter mechanism. The lens system 2 is formed of, for example, a varifocal lens and is constructed from the focal lens system 201 and the zoom lens system 202.

The focus motor driving apparatus 207 drives the focus motor 204 according to control signals supplied by the controller 4 to move the focal lens system 201 to the optical axis direction. The zoom motor driving apparatus 208 drives the zoom motor 205 according to the control signals supplied by the controller 4 to move the zoom lens system 202 to the optical axis direction. The diaphragm motor driving apparatus 209 drives the mechanism 203 according to the control signals supplied by the controller 4 to set, for example, a diaphragm stop of the diaphragm.

The CCD 302 converts an image input via the lens unit into electric signals (analog image data). The CDS circuit 303 is a circuit to make noise reduced for a CCD-type image pickup device.

Furthermore, the AGC amplifier 304 corrects the level of the signals that have been subjected to correlation double sampling in the CDS circuit 303. The setting is done by setting the setting data (control voltage) on the AGC amplifier 304 via the D/A converter built in the AGC amplifier 304. Furthermore, the A/D converter 305 converts the analog image data input from the CCD via the AGC amplifier 304 into digital image data. In other words, the output signals from the CCD 302 are converted into digital signals via the CDS circuit 303 and the AGC amplifier 304, and by the A/D converter 305 at an optimum sampling frequency, for example, at integral multiple of sub-carrier frequencies of national television system committee (NTSC) signals).

The image pre-processor (IPP) 306, the discrete cosine transform (DCT) 308, and the Huffman encoder/decoder 309 that serve as a digital signal processing unit separate the digital image data input from the A/D converter 305 into color difference (Cb and Cr) and luminance (Y), and carry out various processing and data processing to correct and compress/extend an image. The DCT 308 and the Huffman encoder/decoder 309 carry out, for example, orthogonal transformation/reverse orthogonal transformation that is one step of image compression/extension compliant with the Joint Photographic Experts Group (JPEG), Huffman coding/decoding that is one step of the image compression/extension compliant with the JPEG, and so forth.

The IPP 306 detects luminance data (Y) of image data G, and outputs an autoexposure (AE) evaluation value corresponding to the detected luminance data (Y) to the controller 4. This AE evaluation value represents luminance (brightness) of the subject. Further, the IPP 306 outputs auto white balance (AWB) evaluation values corresponding to each luminance data (Y) of red (R), green (G) and blue (B) image data, respectively, to the controller 4 within a preset color temperature range. These AWB evaluation values represent color elements of the subject.

Furthermore, the memory card controller (MCC) 310 stores the compression-processed image once and records it to the PC card 312 or reads it out of the PC card 312 via the card interface 311.

The numeral 313 represents a driver for external communication and is used for communication with external units according to standard communication protocols such as universal serial bus (USB) and Institute of Electrical and Electronics Engineers (IEEE) 1394, and connected to a personal computer (PC) 001 and the like, to swap data with them. Alternatively, the driver for external communication 313 is made capable of connecting to the PC 001 or the AC adapter 703 via a communication/power source adapter connectable to a camera, thereby allowing power and communication to be swapped.

The LCD displaying unit 602 is formed of a transmission-type LCD and displays image data, an operation menu, and the like. The auxiliary lamp 603 is a back light to illuminate the LCD displaying unit 602 and is formed of, for example, a fluorescent tube or a white light-emitting diode (LED). The auxiliary lamp driving circuit 604 puts on the auxiliary lamp 603 by outputting driving power to the auxiliary lamp 603 based on the control of the controller 4.

The LCD driver circuit 601 is a circuit to display image data input from the IPP 306 on the LCD displaying unit 602. The controlling unit 9 is provided with the release switches 901 to give a photographing instruction, the mode input unit 902, a power switch, a LCD switch, an auxiliary lamp switch, buttons with which function selection and other various settings are externally carried out, and the like. As to the symbols illustrated on the mode input unit 902 in FIG. 1, the symbols of a microphone (on the left), a camera (at the center), and a video camera (on the right) represent an audio recording mode, still image recording, and moving image recording, respectively.

The flash lamp circuit 5 generates flashlight by control of the controller 4. The battery A 701 and the battery B 702 are, for example, a nickel-hydrogen cell, a lithium ion battery, a nickel-cadmium (NiCd) battery, or an alkaline cell. In some cases, a supply voltage of the AC adapter 703 may be supplied, and the supply voltage is supplied inside of the digital camera 1 via the DC-DC converter 7. The DC-DC converter 7 has a built-in switch circuit that turns on/off various power sources that output the supply voltage inside of the digital camera 1 by control of the controller 4.

The controller 4 is composed of a CPU, a ROM, a random access memory (RAM), an A/D converter, a D/A converter, and the like. The CPU controls the whole apparatus of the digital camera 1 according to instructions from the controlling unit 9, or an external operation instruction by a remote control (not shown) or the like using the RAM as a work area according to a control program stored in the ROM. When the A/D converter and the D/A converter are externally prepared, they are prepared as the A/D 402 and the D/A 403, respectively. Specifically, the controller 4 controls photographing actions, autoexposure (AE) actions, auto white balance (AWB) adjustment actions, autofocus (AF) actions, display, and the like. The controller 4 takes in analog information using the built-in A/D converter as one of information input units for various controls. Taking in the analog information is carried out with the built-in A/D converter with comparison to the reference voltage.

On the other hand, the D/A converter is used for analog outputs. For example, control of the IPP 306 and the controller 4, and data swapping are carried out via the system bus 404. Further, the controller 4 is provided with a recording mode in which image data obtained by photographing a subject is recorded in the PC card 312, a playback mode in which the image data recorded in the PC card 312 is played back to be displayed on the LCD displaying unit 602, a monitoring mode in which a monitoring image photographed is directly displayed on the LCD displaying unit 602, and the like. As for the display mode at the time when an image is displayed on the LCD displaying unit 602 in the playback mode and the monitoring mode, a fix mode and an outside light adaptive mode are provided. The mode selection is carried out by the controlling unit 9.

Various parameters and data of a digital camera are recorded in the flash memory 401. The timing generator (TG) 301 generates a variety of timing signals based on horizontal and vertical synchronizing signals input from the IPP 306.

The audio amplifying unit 8 amplifies analog signals of the microphone 801, the loudspeaker 802, and the earphone 803 via the A/D 402 or D/A 403 of the controller 4. A beeper from an output (not shown) of the controller 4 may be used in place of the loudspeaker 802 as the audio output unit.

The vibration motor 1002 is one unit of a warning unit. Control signals from the controller 4 allow the vibration motor driving apparatus 1001 to operate and the driver 1001 drives the vibration motor 1002, thereby giving warning with vibration.

Figure 2:
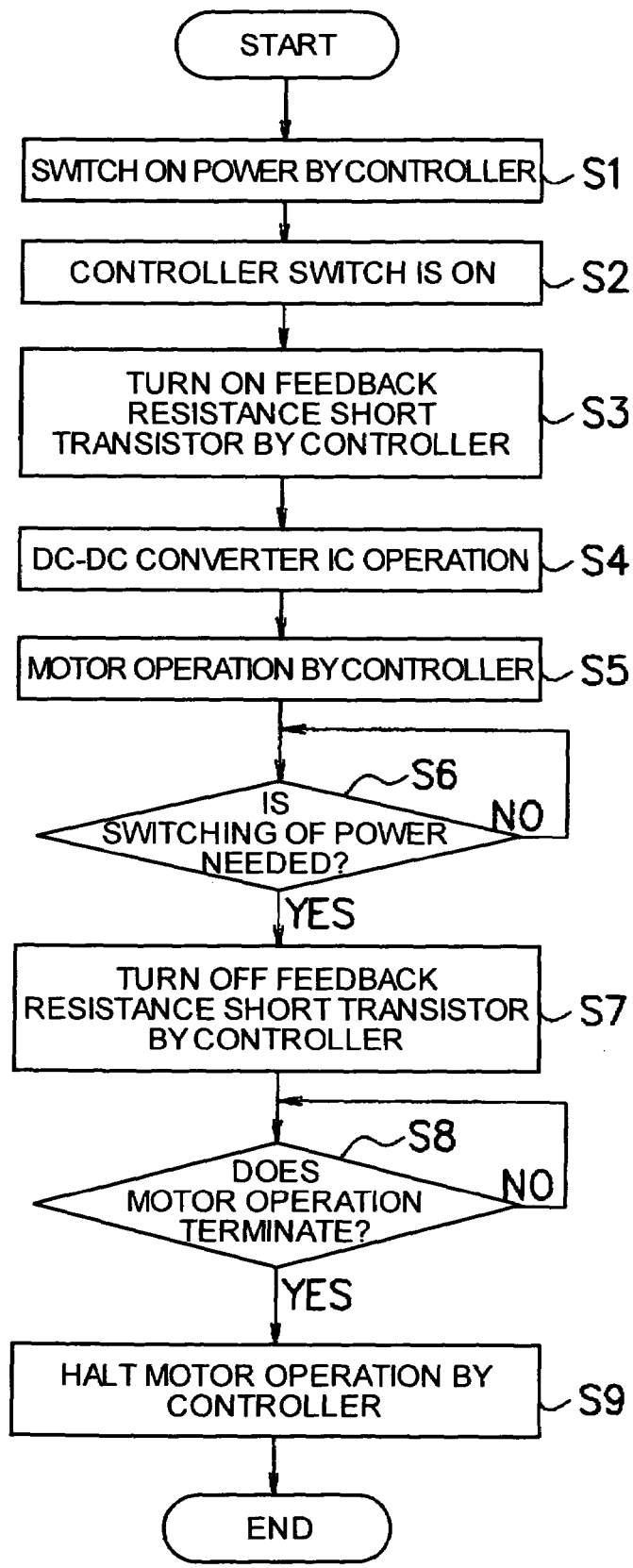
FIG. 2 is a flowchart of an operation of a motor at a time of activation according to an embodiment of the present invention.

FIG. 2 is a flowchart of an operation of a motor at a time of activation according to an embodiment of the present invention. The controller turns on power (step S1) to turn on the controller switch (step S2). Then, the feedback resistance are shorted to set the output voltage high (step S3). An operation of the DC-DC converter IC is initiated (step S4), thereby initiating a motor operation (step S5). When switching of the supply voltage that allows the motor operation is necessary ("YES" at step S6), the short of the feedback resistance is cancelled and the voltage is lowered (step S7). Then, the motor operation is halted ("YES" at step S8, step S9).

Figure 3:
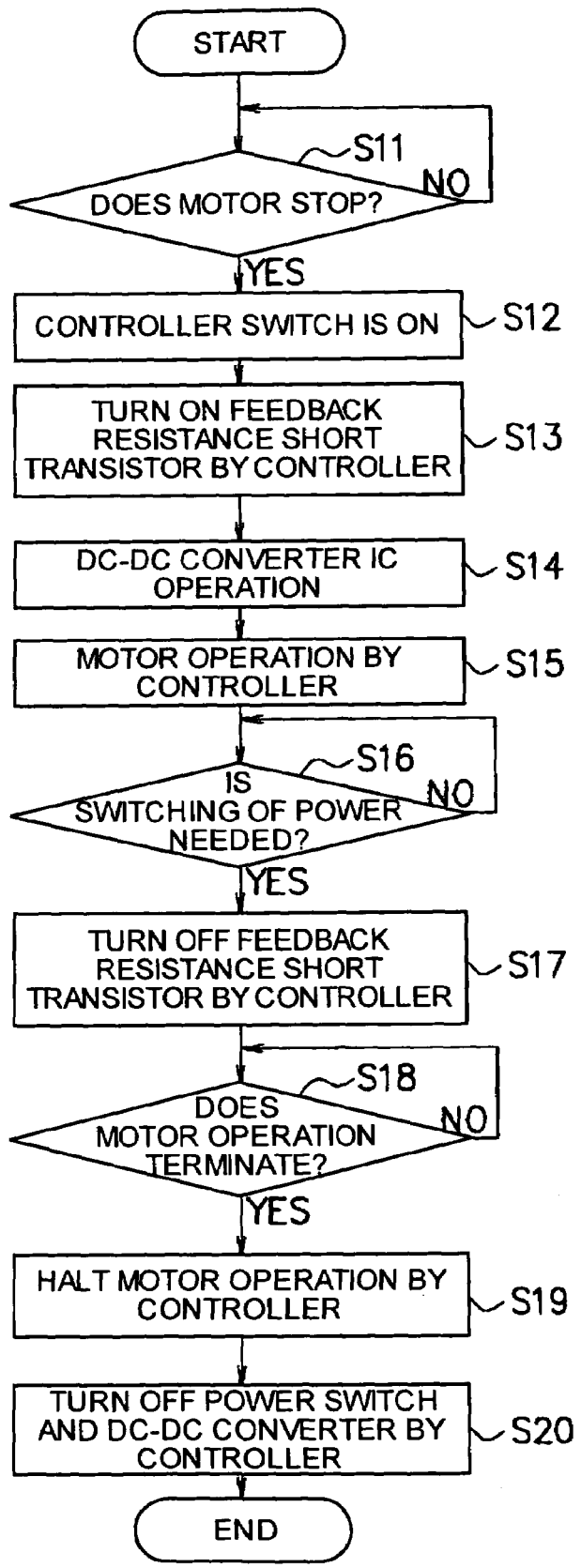
FIG. 3 is a flowchart of an operation of the motor at a time of termination according to an embodiment of the present invention.

FIG. 3 a flowchart of an operation of the motor at a time of termination according to an embodiment of the present invention. When the motor drive terminates ("YES" at step S11), the controller switch is turned on (step S12). Then, the feedback resistance are shorted and the output voltage is set high (step S13). The DC-DC converter IC is allowed to operate (step S14) to initiate a motor operation (step S15). When switching of the supply voltage that allows the motor operation is necessary ("YES" at step S16), the short of the feedback resistance is cancelled to lower the voltage (step S17), and the controller halts the motor operation ("YES" at step S18, step S19). Then, the power switch and the DC-DC converter are turned off (step S20). In this way, in the same manner as in a case at the time of activation shown in FIG. 2, the short of the feedback resistance is also turned on/off at the time of termination, thereby controlling the motor drive voltage.

According to the embodiments of the present invention, the conventional disadvantages can be solved by preventing power loss as much as possible by changing the output voltage of the power source directly by means of variably changing the feedback resistance of the power circuit.

Therefore, according to the present embodiment, the output voltage of the power source is directly changed by the feedback resistance at the time of high-speed activation or low-speed activation, thereby reducing power loss.

Furthermore, according to the present embodiment, the output voltage of the power source is directly changed by the feedback resistance at the time of termination in the same manner as in the time of activation, thereby reducing power loss. In addition, power loss is further reduced by changing the output voltage at the time of both activation and termination.

Moreover, according to the present embodiment, when the voltage is changed until the power is turned off, the power is turned off, thereby preventing such power-off from occurring by setting the resistance values of the feedback resistance.

Furthermore, according to the present embodiment, the voltage can be lowered within a short time even when the voltage is lowered due to excess load. Therefore, there is no power loss.

Moreover, according to the present embodiment, when synchronized rectification is used together, the voltage change can be carried out within a short time by shorting both ends of the rectifier diode not only at the above time but also at the time when a load is not applied. Therefore, there is no power loss.

Furthermore, according to the present embodiment, the use of the power circuit to control the output voltage via the feedback resistance for the power source of the lens barrel motor having a large effect on the batteries due to its large power consumption makes it possible to activate the motor at a high speed as well as to reduce power loss.

While the embodiments of the present invention have been explained as above, the present invention is not limited to the above embodiments, and various modifications are possible without departing from the scope of the invention.

According to the present invention, it is possible to reduce power loss.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A motor driving apparatus comprising a power circuit configured to control, via a feedback variable resistance, an output voltage that is applied to a motor, wherein
the power circuit is configured to vary a resistance of the feedback variable resistance at a time of start of activation of the motor thereby causing the motor to be selectively activated at either a high speed or a low speed.

2. The motor driving apparatus according to claim 1, wherein the power circuit includes,
an overvoltage protection circuit, and
a short protection circuit,
wherein the power circuit is configured to vary the resistance in such a manner that the output voltage is within a range that at least one of the overvoltage protection circuit or the short protection circuit is not activated.

3. The motor driving apparatus according to claim 1, wherein the power circuit is configured to vary the resistance in such a manner that the output voltage is lowered when a load is applied.

4. The motor driving apparatus according to claim 1, wherein the power circuit is configured to vary, by discharging a voltage of a capacitor arranged in parallel with the motor, the resistance in such a manner that the output voltage is lowered.

5. The motor driving apparatus according to claim 1, wherein the motor driving apparatus is used for a power source of a motor that is used for a lens barrel for an image input unit.

6. A motor driving apparatus comprising a power circuit configured to control, via a feedback variable resistance, an output voltage that is applied to a motor, wherein
the power circuit is configured to vary a resistance of the feedback variable resistance at a time of termination of activation of the motor thereby causing the motor to be selectively activated at either a high speed or a low speed.

7. The motor driving apparatus according to claim 6, wherein the power circuit includes,
an overvoltage protection circuit, and
a short protection circuit,
wherein the power circuit is configured to vary the resistance in such a manner that the output voltage is within a range that at least one of the overvoltage protection circuit or the short protection circuit is not activated.

8. The motor driving apparatus according to claim 6, wherein the power circuit is configured to vary the resistance in such a manner that the output voltage is lowered when a load is applied.

9. The motor driving apparatus according to claim 6, wherein the power circuit is configured to vary, by discharging a voltage of a capacitor arranged in parallel with the motor, the resistance in such a manner that the output voltage is lowered.

10. The motor driving apparatus according to claim 6, wherein the motor driving apparatus is used for a power source of a motor that is used for a lens barrel for an image input unit.

11. A motor driving apparatus comprising a power circuit configured to control, via a feedback variable resistance, an output voltage that is applied to a motor, wherein
the power circuit is configured to vary a resistance of the feedback variable resistance at times of start and termination of activation of the motor thereby causing the motor to be selectively activated at either a high speed or a low speed.

12. The motor driving apparatus according to claim 11, wherein the power circuit includes, an overvoltage protection circuit, and
a short protection circuit,
  wherein the power circuit is configured to vary the resistance in such a manner that the output voltage is within a range that at least one of the overvoltage protection circuit or the short protection circuit is not activated.

13. The motor driving apparatus according to claim 11, wherein the power circuit is configured to vary the resistance in such a manner that the output voltage is lowered when a load is applied.

14. The motor driving apparatus according to claim 11, wherein the power circuit varies, by discharging a voltage of a capacitor arranged in parallel with the motor, the resistance in such a manner that the output voltage is lowered.

15. The motor driving apparatus according to claim 11, wherein the motor driving apparatus is used for a power source of a motor that is used for a lens barrel for an image input unit.

16. A digital camera comprising a motor driving apparatus that includes a power circuit configured to control, via a feedback variable resistance, an output voltage that is applied to a motor, wherein
  the power circuit is configured to vary a resistance of the feedback variable resistance at a time of start of activation of the motor thereby causing the motor to be selectively activated at either a high speed or a low speed.

17. A digital camera comprising a motor driving apparatus that includes a power circuit configured to control, via a feedback variable resistance, an output voltage that is applied to a motor, wherein
  the power circuit is configured to vary a resistance of the feedback variable resistance at a time of termination of activation of the motor thereby causing the motor to be selectively activated at either a high speed or a low speed.

18. A digital camera comprising a motor driving apparatus that includes a power circuit configured to control, via a feedback variable resistance, an output voltage that is applied to a motor, wherein
  the power circuit is configured to vary a resistance of the feedback variable resistance at times of start and termination of activation of the motor thereby causing the motor to be selectively activated at either a high speed or a low speed.

19. A motor controlling method comprising controlling, via a feedback variable resistance, an output voltage that is applied to a motor, wherein
  the controlling includes varying resistance of the feedback variable resistance at a time of at least one of start of activation of the motor thereby causing the motor to be selectively activated at either a high speed or a low speed.

20. The motor controlling method according to claim 19, wherein the controlling further includes,
  varying the resistance in such a manner that the output voltage is within a range that at least one of an overvoltage protection circuit or a short protection circuit that are included in a power circuit is not activated.

21. The motor driving apparatus according to claim 19, wherein the controlling further includes,
  varying the resistance in such a manner that the output voltage is lowered when a load is applied.

22. The motor controlling method according to claim 19, wherein the controlling further includes,
  varying, by discharging a voltage of a capacitor that is arranged in parallel with the motor in a power circuit, the resistance in such a manner that the output voltage is lowered.

23. The motor controlling method according to claim 19, wherein the motor controlling method is used to control a power source of a motor that is used for a lens barrel for an image input unit.

24. The motor driving apparatus of claim 1, wherein the feedback variable resistance includes at least two resistors in series, and is varied by short-circuiting at least one of the at least two resistors by an electronic switch.

25. The motor driving apparatus of claim 6, wherein the feedback variable resistance includes at least two resistors in series, and is varied by short-circuiting at least one of the at least two resistors by an electronic switch.

26. The motor driving apparatus of claim 11, wherein the feedback variable resistance includes at least two resistors in series, and is varied by short-circuiting at least one of the at least two resistors by an electronic switch.

27. The digital camera of claim 16, wherein the feedback variable resistance includes at least two resistors in series, and is varied by short-circuiting at least one of the at least two resistors by an electronic switch.

28. The digital camera of claim 17, wherein the feedback variable resistance includes at least two resistors in series, and is varied by short-circuiting at least one of the at least two resistors by an electronic switch.

29. The digital camera of claim 18, wherein the feedback variable resistance includes at least two resistors in series, and is varied by short-circuiting at least one of the at least two resistors by an electronic switch.

30. The motor controlling method of claim 19, the method further includes:
  varying the feedback variable resistance by short-circuiting at least one of at least two resistors forming the feedback variable resistance by an electronic switch.

* * * * *